US007595909B2

(12) United States Patent
Clark

(10) Patent No.: US 7,595,909 B2
(45) Date of Patent: Sep. 29, 2009

(54) WEB HEAT TRANSFER PRESS WITH AIR BEARING

(76) Inventor: Lloyd Douglas Clark, 15 Conrad St., San Francisco, CA (US) 94131-2924

( * ) Notice: Subject to any disclaimer, the term of this patent is extended or adjusted under 35 U.S.C. 154(b) by 887 days.

(21) Appl. No.: 10/896,310

(22) Filed: Jul. 21, 2004

(65) Prior Publication Data

US 2006/0017942 A1 Jan. 26, 2006

Related U.S. Application Data

(60) Provisional application No. 60/490,370, filed on Jul. 26, 2003.

(51) Int. Cl.
*G06F 15/00* (2006.01)
*B41J 2/32* (2006.01)

(52) U.S. Cl. .......................... 358/1.4; 347/171; 358/1.1

(58) Field of Classification Search .................. 358/1.1, 358/1.9, 1.11–1.18; 428/195.1, 40.1; 347/171, 347/185, 220, 221, 223; 8/509
See application file for complete search history.

(56) References Cited

U.S. PATENT DOCUMENTS

2002/0148054 A1 * 10/2002 Drake ............................ 8/509

* cited by examiner

*Primary Examiner*—Edward L Coles
*Assistant Examiner*—Thierry L Pham

(57) ABSTRACT

A system (799) and method for continuous web sublimate dye transfer printing uses platens (800, 805) which also act as air bearings. The platens are heated by resistive heating elements ( 825 ) or other means. A sandwich of air-impermeable dye-image donor tissue (1100), the medium to be printed (1140), and air-impermeable backup tissue (1115) are fed through the heated air bearing where the dye transfer step occurs. The tissues and medium are supplied on supply rolls (1105, 1120, and 1145) which are restrained by braking mechanisms (not shown). Take-up rolls (1110, 1160, and 1135) are driven by motor-and-clutch mechanisms (not shown) so that the tissues and medium to be printed move through the heated region between the platens without sliding past one-another. The platens are forced together on either side of the tissue-medium sandwich with sufficient pressure to prevent the sublimate dye gas from migrating sideways through the medium being printed.

20 Claims, 4 Drawing Sheets

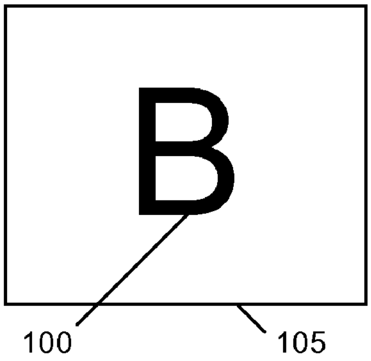
Fig. 1--Prior Art
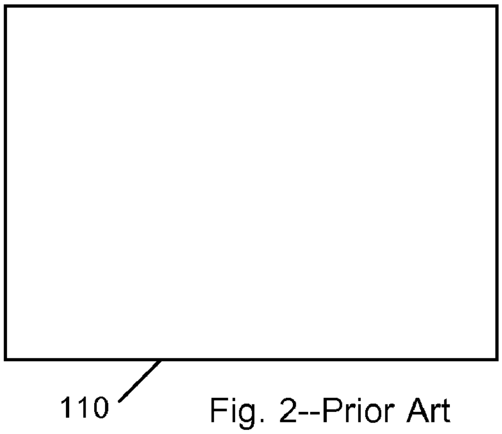
Fig. 2--Prior Art
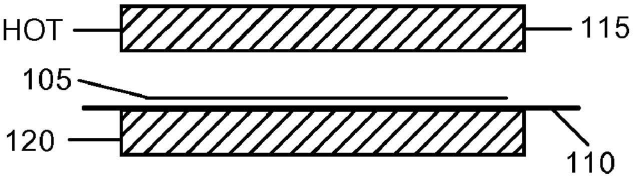
Fig. 3--Prior Art
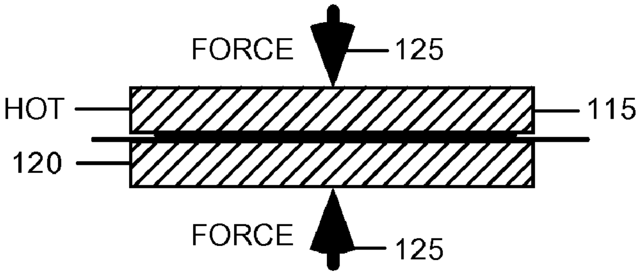
Fig. 4--Prior Art
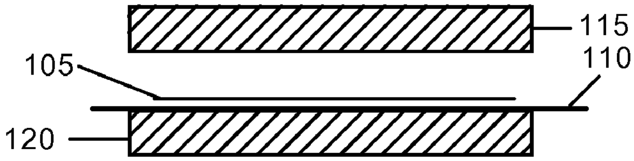
Fig. 5--Prior Art
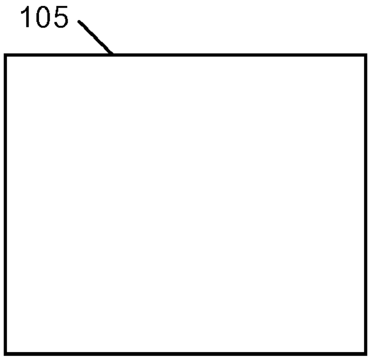
Fig. 6--Prior Art
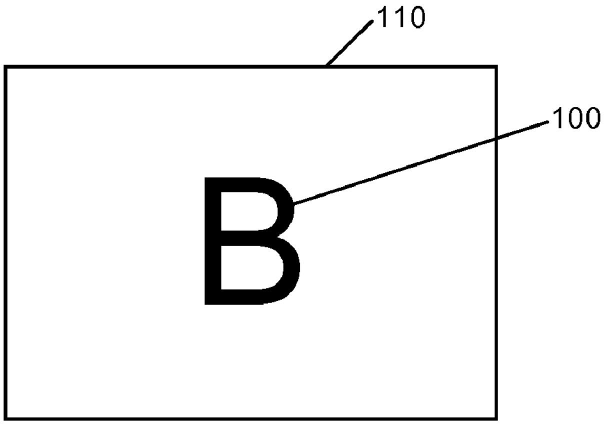
Fig. 7--Prior Art

WEB HEAT TRANSFER PRESS WITH AIR BEARING

CROSS-REFERENCE TO RELATED APPLICATIONS

This application claims priority of provisional patent application, Ser. No. 60/490,370, filed Jul. 26, 2003.

FEDERALLY SPONSORED RESEARCH

None

SEQUENCE LISTING

None

BACKGROUND

1. Field of Invention

This invention relates generally to heat transfer presses, and in particular to a heat transfer press for transferring sublimate dye images to textiles and films.

2. Prior-Art

Flat-Bed Heat Transfer Presses—FIGS. 1-7

Image transfer through dye-sublimation printing is an old and well-established art. A reverse, sublimate dye image 100 is first applied to a paper or tissue carrier or donor sheet 105 by a printing method such as a rotogravure or offset press (not shown), as indicated in FIG. 1. Sublimate dye formulations are well-known by those skilled in the art of dye-sublimation printing. Image 100 will be transferred from sheet 105 to a receiving medium 110 (FIG. 2) in the following steps. Medium 110 can comprise textiles, plastic film, wood, and many other image-receivers.

The dye-bearing side of donor sheet 105 is placed against a surface of medium 110 to which image 100 is to be transferred. Sheet 105 and medium 110 are then placed in a heat press, indicated schematically by planar platens 115 and 120 in FIG. 3. Platens 115 and 120 typically range in size from 10 cm to over 1.50 m on a side. They can be square, rectangular, and even circular in shape. Platen 115 is typically maintained at a temperature of 200 degrees Celsius (C.). Platen 120 is generally not heated, but comprises a metal plate with a thin layer, typically 0.7 cm thick, of high-temperature rubber padding on its top surface.

In FIG. 4, image 100 is transferred from sheet 105 to medium 110 by forcing the two into intimate contact between platens 115 and 120 while heating them for a predetermined period of time, called the dwell time. Platens 115 and 120 are forced together as indicated by arrows 125 for a typical dwell time between 10 and 60 seconds in order to effect image transfer. During this time, the dye in image 100 sublimes, or passes from a solid state to a gaseous state. The resulting dye gas (not shown) is absorbed by medium 110, permanently marking it. The magnitude of force indicated by arrows 125 is typically sufficient to cause a pressure of between 0.1 and 10 kg/cm$^2$ between the platens.

After the dwell time, platens 115 and 120 are separated, as shown in FIG. 5. Sheet 105 and medium 110 are removed from the press, separated, and sheet 105 is discarded. As shown in FIGS. 6 and 7, the reverse of image 100 has been transferred from sheet 105 to medium 110.

Flat-bed heat transfer presses of the type described above are manufactured by Adams International Technologies, of Ball Ground, Ga., U.S.A.

While flat bed presses of the type described above work well in many applications, they are not well-suited to continuous-web manufacture since they must be opened for insertion and removal of goods and closed for a period during image transfer.

Flat-Bed Heat Transfer Presses for Continuous Use

In U.S. patent application publication No. US 2002/0148054 A1, Drake teaches a belt-type heat transfer press in which the dye donor sheet and receiving medium are transported between moving belts. The belts move the sheet and medium through heat transfer stations on a continuous basis.

While Drake's heat transfer press offers certain advantages of prior-art platen presses, it requires two moving belts, each comprising a low-friction surface on one side, and a high-friction surface on the other. The low-friction surface allows the belts to slide along a support surface, while the high-friction side holds the donor sheet and receiving medium firmly in place. These belts are moved by pulleys attached to a frame. Despite the presence of the low-friction surface, significant frictional forces must be overcome to move the belt. In addition, wear of the belt is a consequence of its sliding along its supports.

Transport Mechanism with Rolling Belts Supported by Air Bearings

In U.S. Pat. No. 4,495,021 (1985), Goldsworthy teaches a system for maintaining pressure on a length of laminate as it moves through a processing station. The laminate is squeezed between two moving belts. Force is applied to the back of each belt by an air bearing. Large forces can be applied by an air bearing, yet little frictional force results since the supported surface rides on a film of air.

While the air bearings provide an improvement by reducing friction due to belt motion, Goldsworthy's system merely applies pressure to a laminate by squeezing it between two belts.

Transport Mechanism with Carrier Tape Supported by Air Bearings

In U.S. Pat. No. 4,594,129 (1986), Bok teaches a floating transport mechanism in which substrates are attached to a tape belt and moved through a plasma discharge processing station within a vacuum chamber. The belt and substrates are supported by nearly-frictionless air bearings. Cold gas passed through the bearings is also used to cool the belt and substrates after processing of the substrates in a plasma discharge.

While air bearings are used to provide cooling, support, and nearly frictionless motion, they are not directly involved in the processing of the wafer.

Transport Mechanism for Continuous Honeycomb Panel Molding Method

In U.S. Pat. No. 5,037,498 (1991), Umeda teaches a method and apparatus for the continuous production of a honeycomb panel laminated with a prepreg material. As part of the curing and finishing process, he uses two opposed, pre-loaded air bearings which apply heated air to the assembled honeycomb sandwich. The air bearings are 120 cm square and are pre-loaded with a force of 800 kg, resulting in a pressure at the work surface of 55.6 g/cm$^2$. Air at 130 deg. C. flowing through each bearing both flattens and post-cures the materials in his honeycomb sandwich.

While this system doesn't print dye-sublimation images on Umeda's panels, it does show the use of air bearings to provide heated air and a low-friction processing step.

Sublimatic Printing Machine

In U.S. Pat. No. 3,949,574 (1976), Glover teaches a system which transfers a sublimate dye image by heating a donor sheet and receiving medium in a flat platen press. Both platens of the press are porous and supplied with air flow. Air passes from the heated platen through the donor sheet, carrying the gaseous phase of the dye into the receiving medium, typically a rug or carpet. The second platen is optionally connected to a vacuum source, further drawing the sublimed dye into the receiving medium. The result is deep penetration of the dye into the medium.

While Glover's system accomplishes improved dyeing, it does not perform on a continuous basis. His platens must be separated to introduce a new donor sheet and receiving medium for each piece to be printed.

Rotary Heat Transfer Presses

Belt-and-drum, rotary heat transfer presses are well-known to those skilled in the art of dye-sublimation printing of textiles and films. Similar presses are taught by Miller in U.S. Pat. No. 4,710,271 (1987) and U.S. Pat. No. 4,889,048 (1989), Haigh in U.S. Pat. No. 3,319,352 (1967), and many others. While their end use as taught may be different, the structure of all these is similar to a dye-sublimation heat transfer press.

In these presses, a large, rotating drum is typically filled with hot oil. A thick fabric belt is wrapped around most of the circumference of the drum, then passes over rollers which guide the web around the back side of the drum.

A sandwich of fabric to be printed and a previously-printed donor sheet are fed into the nip between the drum and the fabric web as the drum rotates. The two are held at a high temperature for a dwell time determined by the rate of rotation of the drum. As they emerge from the other side of the drum, the fabric and donor sheet are separated and the dye-transfer printing is complete.

Such rotary dye-sublimation transfer printing presses have been in use for many years. Drawbacks to their use include significant initial equipment cost, and the cost and labor associated with replacing the belt. In addition, a significant amount of heat is removed from the drum by the belt and lost to the ambient atmosphere as the belt travels around its path and back to the drum. Additional heat is lost by the exposed surface of the drum adjacent the nip where the fabric and donor sheet are introduced, and the point at which they exit contact with the drum.

Thus while such transfer presses perform their intended task, they are expensive, large, and inefficient.

OBJECTS AND ADVANTAGES

Accordingly, several objects and advantages of the present invention are to provide an improved sublimate dye-transfer-printing system which can print a continuous web without the interruption of multiple transfer operations, which does not employ a belt wrapped around a drum to provide dwell time at an elevated temperature, which is simple in construction and low in cost, and which employs air bearing technology to reduce friction thereby reducing mechanical drive requirements to move the fabric and donor sheet through the heat transfer zone. Other objects and advantages are to utilize the heat gained during pressurization of the air for the air bearings so that only supplemental heating of the air bearing platens is required, resulting in a thermally efficient system.

Additional objects and advantages will become apparent from a consideration of the drawings and ensuing description thereof.

SUMMARY

In accordance with the present invention, a method, apparatus, and system are provided for producing a low-cost dye-sublimation transfer printing press. A donor sheet a receiving medium, and a backup sheet are maintained in intimate contact as they are effortlessly drawn through the apparatus as a continuous web, and forced together by opposing air bearings which also provide heat.

BRIEF DESCRIPTION OF THE DRAWINGS

FIGS. 1 through 7 show a prior-art platen press, donor and receptor sheets, and images before and after transfer.

FIG. 11 shows a transfer press according to the present invention in the open on.

DRAWING FIGURE REFERENCE NUMERALS

| | | | |
|---|---|---|---|
| 100 | Dye image | 105 | Donor sheet |
| 110 | Receiving medium | 115 | Platen |
| 120 | Platen | 799 | Transfer Press |
| 800 | Platen | 805 | Platen |
| 810 | Hole | 815 | Air flow indicating arrow |
| 820 | Unspecified barrier | 825 | Resistive heating elements |
| 830 | Radiant heater | 900 | Plenum |
| 902 | Air source | 1000 | Pipes |
| 1100 | Donor sheet | 1105 | Donor sheet supply roll |
| 1107 | Roller | 1108 | Roller |
| 1110 | Donor sheet take-up roll | 1115 | Medium |
| 1120 | Medium supply roll | 1125 | Roller |
| 1130 | Roller | 1135 | Medium take-up roll |
| 1140 | Backup tissue | 1145 | Roller |
| 1150 | Roller | 1155 | Roller |
| 1160 | Backup tissue take-up roll | 1300 | Pipe |

DETAILED DESCRIPTION

Figure 8:
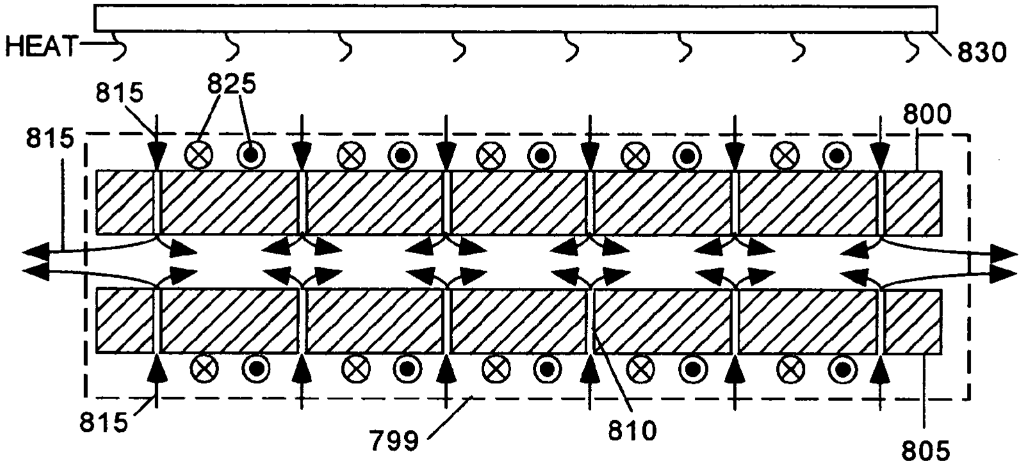
FIG. 8 shows two opposed, heated platens with air flow as contemplated in the present invention.
Figure 9:
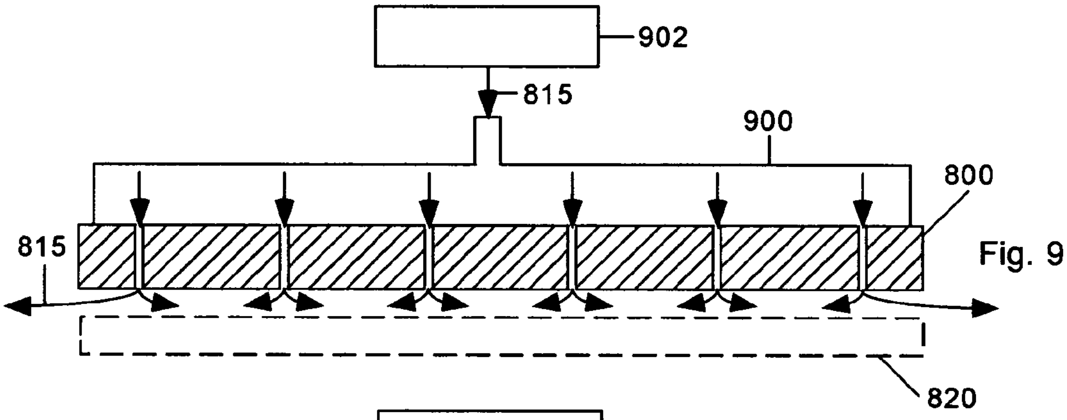
FIG. 9 shows a platen with air distribution by a plenum.
Figure 10:
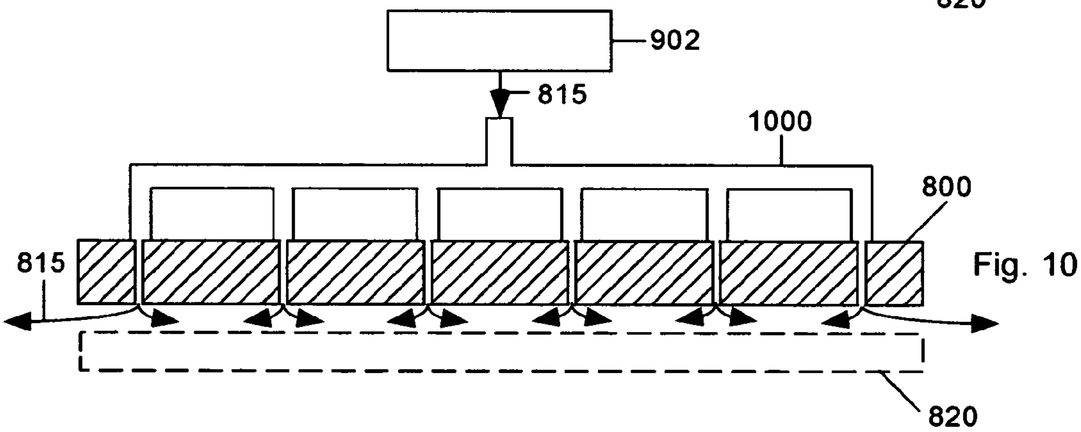
FIG. 10 shows a platen with air distribution by piping.

Preferred Embodiment—FIGS. 8 THROUGH 10

In accordance with a preferred embodiment of the invention a heat transfer press, indicated generally by the dashed lines at 799, is provided which comprises two opposed platens which further comprise air bearings. In FIG. 8, each of platens 800 and 805 is supplied with one or more holes 810 through which air is forced, as indicated by air flow indicating arrows 815. Holes 810 are preferably between 1 and 5 mm in diameter.

Platens 800 and 805 are preferably planar, between 1 and 3 cm thick, and of any required extent in orthogonal directions perpendicular to their thickness, typically several tens of cm.

Platens 800 and 805 are preferably steel, but can be made of any other metal, including aluminum. They can be solid or made of a porous material such as sintered bronze.

Air from an air source 902 is delivered to platens 800 and 805 through a plenum 900, shown in FIG. 9. A plenum is generally required if platens 800 and 805 are made of a porous material. Alternatively, air is delivered to platens via individual pipe connections 1000 to each hole, as indicated in FIG. 10.

Air source 902 is widely available. An example is a rotary screw compressor Model ASD37, manufactured by Kaeser Kompressoren of Coburg, Germany.

In the presence of a barrier such as platen 805 (FIG. 8), or other unspecified barrier 820 (dashed lines in FIGS. 9 and 10), air flow as indicated by arrows 815 leaves the region separating platen 800 and barrier 820 by flowing laterally into the region outside the platen and barrier.

Platens 800 and 805 are optionally heated by any of a variety of means including resistive heating shown by elements 825 in intimate contact with them, high-pressure steam passed through pipes (not shown) also in intimate contact with plenums 800 and 805, and radiant heaters 830. Some heat is also available from compression of the air being delivered by air source 902. Platens 800 and 805 may be kept at different temperatures. One of them may even be cooled, if it is desired to impose a large thermal gradient from one to the other. The temperatures of platens 800 and 805 are preferably regulated by temperature controllers (not shown).

Figure 11:
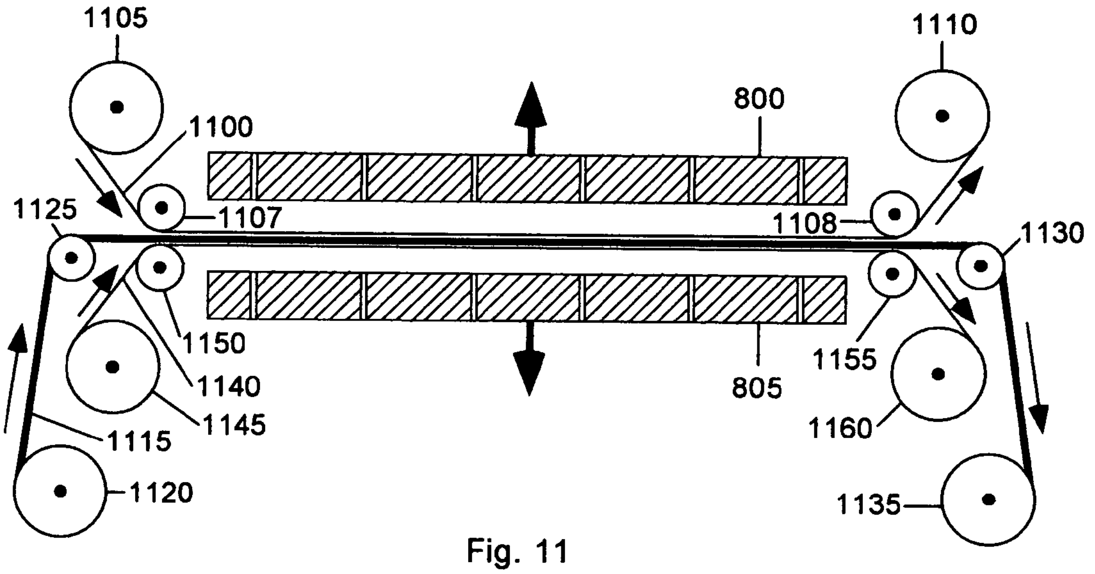
Figure 12:
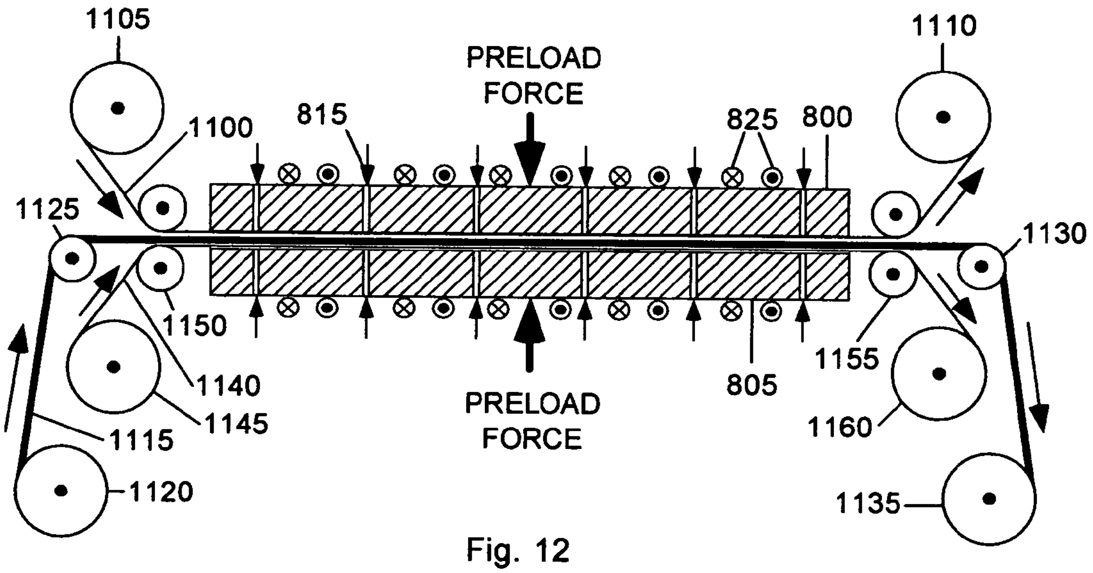
FIG. 12 shows the transfer press of FIG. 11 in the closed position.
Figure 13:
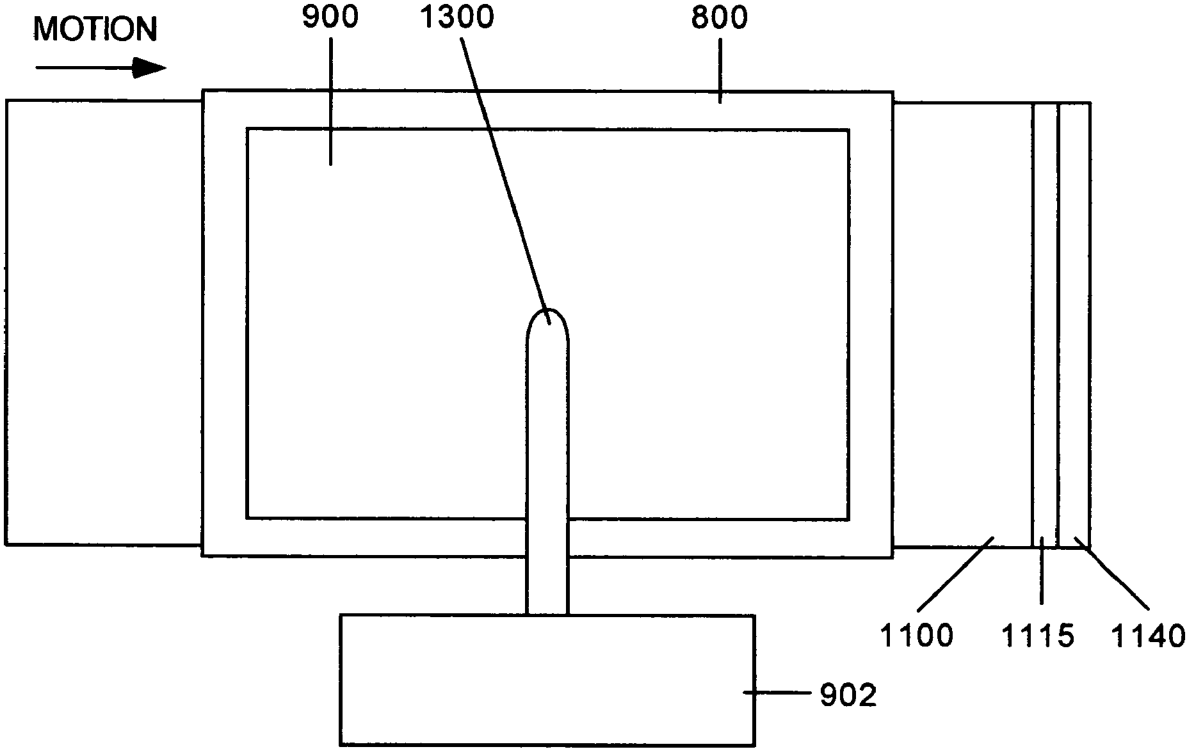
FIG. 13 shows a plan view of the press shown in FIGS. 11 and 12

Operation—Preferred Embodiment—FIGS. 11 through 13

In the discussion to follow, it is presumed that platen 800 is heated by one of the aforementioned means. Platen 805 may also be heated in a similar fashion, or maintained at a lower temperature as dictated by the requirements of the particular sublimation printing process employed.

The air supply indicated by arrows 815 is initially turned OFF. The heat sources for platens 800 and 805 are optionally also turned OFF.

Platens 800 and 805 are then separated by a distance sufficient to permit an operator (not shown) to load the press assembly. Pre-printed sublimate-dye-bearing donor tissue 1100 is threaded from supply roll 1105 over roller 1107 to roller 1108 and to take-up roll 1110. Tissue 1100 is oriented so that its dye-printed surface faces medium 1115 to be printed, such as a textile or film. Tissue 1100 is presumed to be air-impermeable so that it will block air indicated by arrows 815 from contacting medium 1115. Medium 1115 is threaded from supply roll 1120, over roller 1125, to roller 1130, and to take-up roll 1135. Backup tissue 1140 is threaded from supply roll 1120, over roller 1150, to roller 1155, and to take-up roll 1160.

Tissue 1140 is available from a variety of sources including Beaver Paper Company, of Atlanta, Ga., U.S.A. It is called "thermal transfer tissue" and is sold under the mark Pro-Tex.

Rollers 1107, 1125, 1150, 1108, 1155, and 1130 are positioned so that tissue 1100, medium 1115, and backup tissue 1140 are in intimate contact. The centroid of the sandwich is coincident with a line drawn between platens 800 and 805 when they are forced together during printing, as explained below. The above-mentioned rollers can be either cylindrical or crowned.

During dye-transfer printing, rolls 1105, 1120, and 1145 are allowed to rotate, but prevented from rotating freely by a braking arrangement (not shown). Rolls 1110, 1160, and 1135 are caused to rotate in order to move tissue 1100, medium 1115, and tissue 1140 from left-to-right through the region between platens 800 and 805. Rolls 1110, 1160, and 1135 are driven in concert so that tissue 1100, medium 1115, and tissue 1140 move at exactly the same rate and do not move relative to one-another during transfer printing. This is accomplished by well-known motor-and-clutch mechanisms (not shown).

To perform the dye-transfer printing operation, platens 800 and 805 are first brought into contact with the above-described sandwich comprising tissue 1100, medium 1115, and tissue 1140, as shown in FIG. 12.

Platens 800 and 805 are further forced together, or "pre-loaded", as described above. The preloading force required is determined by the requirements of the particular transfer printing operation. It is typically sufficient to cause a pressure of at least 100 g/cm$^2$ between the platens.

Next air from source 902 is turned ON and flows as shown by arrows 815 and as described above. Tissues 1100 and 1140 are impermeable to air flow and therefore are forced together by a force determined by the preloading force described above. This force acts nominally over the entire surface of platens 800 and 805.

Next, heat sources 825 are energized and platens 800 and 805 are brought to their operating temperature, typically 200 degrees C.

Finally, motive power is applied to take-up rolls 1110, 1135, and 1160 and the braking mechanism for rolls 1105, 1120, and 1145 is activated, as described above. The sandwich comprising tissue 1100, medium 1115, and tissue 1140 is thus forced together, and drawn through the region between platens 800 and 805. The sandwich moves through this region virtually without friction because of the action of the air bearings formed between platen 800 and the top surface of tissue 1100, and platen 805 and the bottom surface of tissue 1140.

The dwell time, or time at an elevated temperature when the dye transfer printing step takes place, is determined by the length of the press in the process (printing) direction and the rate of motion of the web through the press. This is typically between 10 and 60 seconds.

FIG. 13 shows a plan view of the heat press assembly with a sandwich of dye donor tissue 1100, medium 1115, and backup tissue 1140 moving therethrough. The direction of motion is indicated by the arrow at the upper left of the figure. This embodiment communicates air from air source 902 through pipe 1300, and to plenum 900, as shown in FIG. 9. Plenum 900 is affixed to platen 800. Platen 805 lies beneath platen 800 and is not visible in this view. Supply, take-up, and guide rollers have been eliminated from this view for clarity. Heating elements lie out of view beneath plenum 900.

CONCLUSIONS, RAMIFICATIONS, AND SCOPE

Thus it is seen that I have provided a simple, low-cost system and method which can transfer sublimate dye images from a donor sheet to a receiving medium. The press assembly comprises only an air source, a heat source, two flat plates with one or more holes in each, and supply and take-up rolls for the materials to be passed through the press. No expensive rollers or fabric belts are required.

Some of the heat required to elevate the platens to operating temperature can be provided by the compressed air source, since compressing air causes its temperature to rise.

Recirculating the air which exhausts from the press back through the press can also scavenge some heat which would otherwise be lost. If this air is too contaminated by reaction products produced within the press, a heat exchanger can be used to extract heat from the exhaust gases. Finally, the remaining heat required to raise the platens to their proper operating temperature is obtained from resistive heating elements, steam heat, radiant heat, or a combination of these. Thermal insulating material covering heated parts of the press will further increase operating efficiency.

Air exhausted from the press can be captured and processed to remove any undesirable vapors arising from the heat transfer operation.

Instead of air, another gas or a mixture of gases can be used.

In the event air-permeable sublimate dye donor paper is used, a second layer of back-up thermal transfer tissue is positioned above this paper and adjacent the top platen in order to cause platen 800 to apply pressure to the donor paper, instead of allowing the air to pass through it. This assures that the sandwich of tissues and medium is firmly compressed and that dye gases do not flow in a direction parallel to the plane of the medium being printed.

A chamfer can be added to the platens along the edge where the tissue-fabric sandwich enters. This will provide smoother entry into the transfer area.

Rollers can be added ahead of the edge where the tissue-fabric sandwich enters the press. These can flatten knots and bumps in the fabric which otherwise might get caught at the entrance to the press.

While the above description contains many specificities, it will be apparent that the invention is not limited to these and can be practiced with other parameters and materials. A smooth or a lightly textured platen surface can be used. A non-stick substance can be applied to the platen surfaces. Different relief shapes can be machined into the platen surfaces, as is well known in the art of air bearing design.

Under some circumstances, an electric potential can be applied between the top and bottom platens. This creates an electric field which encourages normal migration of charged dye molecules into the substance being dyed.

The surfaces of the two platens can be curved or wavy in shape, provided their shapes are complimentary.

Accordingly the scope of this invention should be determined, not by the embodiments illustrated, but by the appended claims and their legal equivalents.

I claim:

1. A heat transfer press for sublimate dye printing, comprising:

a plurality of opposed platens, said platens containing at least one hole each and being urged together by a preloading force, a region outside said platens, an air source, means for delivering air from said source to said hole in each of said platens, means for heating at least one of said platens, a first layer of air-impermeable tissue containing a sublimate dye image, a textile or film to be printed, a second layer of air-impermeable tissue, said layers of tissue being disposed on both surfaces of said textile or film, thus forming a sandwich, said air from said source being arranged to compress said sandwich and urge said platens to separate from said sandwich as said air flows into said region, and a plurality of driven rolls for moving said sandwich between said platens, whereby when said air source delivers said air to said hole in each of said platens, said air passes through said hole and compresses said sandwich and said platens are urged to overcome said preloading force and separate from said sandwich so that said air can escape from between said platens and said sandwich into said region, thereby forming an air bearing and allowing said sandwich to pass freely between said platens when urged by said driven rolls, thereby causing said textile or film to be imprinted with said sublimate dye image.

2. The press of claim 1, wherein said platens are selected from the group consisting of solid and sintered porous materials.

3. The press of claim 1, wherein said platens are made of steel.

4. The press of claim 1, wherein said platens are made of aluminum.

5. The press of claim 1, wherein said means for delivering air is selected from the group consisting of plenums and pipes.

6. The press of claim 1, wherein said means for heating said platens is selected from the group consisting of compressed air, steam, radiant heaters, and resistive heating.

7. The press of claim 1, further including means for cooling at least one of said platens.

8. The press of claim 1, further including means for preloading said platens.

9. A method of sublimate dye printing, comprising:

providing a plurality of opposed platens, said platens containing at least one hole each and being urged together by a preloading force, providing a region outside said platens, providing an air source, providing means for delivering air from said source to said hole in each of said platens, providing means for heating at least one of said platens, providing a first layer of air-impermeable tissue containing a sublimate dye image, providing a textile or film to be printed, providing a second layer of air impermeable tissue, placing said layers of tissue on either surface of said textile or film thus forming a sandwich, providing a plurality of driven rolls for moving said sandwich between said platens, and activating said air source, said driven rolls, and said heating means, whereby when said air source delivers said air to said hole in each of said platens, said air passes through said hole and compresses said sandwich and said platens are urged against said preloading force so that said air can escape from between said platens and said sandwich into said region, thereby forming an air bearing and allowing said sandwich to pass freely between said platens when urged by said driven rolls, thereby causing said textile or film to be imprinted with said sublimate dye image.

10. The method of claim 9, wherein said means for heating is selected from the group consisting of steam, compressed air, radiant, and resistive heating.

11. The method of claim 9, wherein said driven rolls are selected from the group consisting of cylindrical and crowned.

12. The method of claim 9, wherein said means for delivering air is selected from the group consisting of plenums and pipes.

13. A system for dye sublimate printing, comprising:

a plurality of opposed platens, said platens containing at least one hole each and being urged together by a preloading force, a region outside said platens, an air source, means for delivering air from said source to said hole in each of said platens so as to form an air bearing, means for heating at least one of said platens, a first layer of air-impermeable tissue containing a sublimate dye image, a textile or film to be printed, and a second layer of air-impermeable tissue, said layers of tissue being disposed on both surfaces of said textile or film, thus forming a Sandwich, said air from said source being arranged to compress said sandwich and urge said platens to separate from said sandwich as said air flows into said region, and a plurality of driven rolls for moving said sandwich between said platens, whereby when said air source delivers said air to said hole in each of said platens, said air passes through said hole and compresses said sandwich and said platens are urged to overcome said preloading force and separate from said sandwich so that said air can escape from between said platens and said sandwich into said region, thereby forming an air bearing and allowing said sandwich to pass freely between said platens when urged by said driven rolls, thereby causing said textile or film to be imprinted with said sublimate dye image.

14. The system of claim 13, wherein said heating means are selected from the group consisting of compressed air, steam, radiant, and resistive.

15. The system of claim 13, wherein said means for delivering air is selected from the group consisting of plenums and pipes.

16. The system of claim 13, wherein said platens are selected from the group consisting of solid and sintered porous materials.

17. The system of claim 13, wherein at least one of said platens is made of steel.

18. The system of claim 13, wherein at least one of said platens is made of aluminum.

19. The system of claim 13, wherein said roller means are selected from the group consisting of cylindrical and crowned.

20. The system of claim 13, further including means for cooling at least one of said platens.

* * * * *